United States Patent
Fujiwara (10) Patent No.: US 7,215,968 B2
(45) Date of Patent: May 8, 2007

(54) POSITIONAL INFORMATION TRACKING AND FORWARDING METHOD FOR CONDUCTING OPTIMAL FORWARD DESTINATION CONTROL IN CONFORMITY TO ACTUAL SITUATIONS OF USER

(75) Inventor: Hidehiko Fujiwara, Kanagawa (JP)

(73) Assignee: NEC Infrontia Corporation, Kanagawa (JP)

(*) Notice: Subject to any disclaimer, the term of this patent is extended or adjusted under 35 U.S.C. 154(b) by 156 days.

(21) Appl. No.: 10/894,057

(22) Filed: Jul. 20, 2004

(65) Prior Publication Data

US 2005/0026628 A1 Feb. 3, 2005

(30) Foreign Application Priority Data

Jul. 29, 2003 (JP) ............... 2003-281691

(51) Int. Cl.
H04Q 7/20 (2006.01)
(52) U.S. Cl. ............. 455/456.3; 455/417; 455/435.1; 455/414.1
(58) Field of Classification Search ............. 455/414.1, 455/417, 445, 456.1
See application file for complete search history.

(56) References Cited

U.S. PATENT DOCUMENTS 6,038,442 A   3/2000   Ueda et al.
6,130,938 A * 10/2000  Erb .................. 379/211.02
6,330,322 B1 * 12/2001 Foladare et al. ...... 379/211.01
6,477,374 B1 * 11/2002 Shaffer et al. ............. 455/445
2002/0199010 A1 * 12/2002 Ruse et al. ................. 709/232

FOREIGN PATENT DOCUMENTS

| JP | 04-301955 | 10/1992 |
| JP | 05-130227 | 5/1993 |
| JP | 07-131535 | 5/1995 |
| JP | 10-271550 | 10/1998 |
| JP | 2000-102059 | 4/2000 |
| JP | 2002-218541 | 8/2002 |

* cited by examiner

Primary Examiner—Temica Beamer
(74) Attorney, Agent, or Firm—Foley & Lardner LLP (57) ABSTRACT

A positional information tracking and forwarding method is disclosed for conducting an optimal forward destination control method to estimate the situations of a user. A position database stores a plurality of forward destinations for a call to the user that correspond to positional information and time period information (business hours or the like) of the forward destinations. This is used as a search table. For forwarding a call to the user, the current position of the user is detected from the position of a mobile telephone carried by the user, and a forward destination list is created based on the detected current position of the user, the current time, and the search table. The forward destination list enumerates forward destinations that are arranged in an order in which the user is more likely to be present at the forward destinations. The forward destinations are selected one after another in accordance with the forward destination list to forward the call to the user.

6 Claims, 9 Drawing Sheets

| forwarding candidates | extension A | extension B | outside line A (mobile) | outside line A | outside line B | outside line C |
|---|---|---|---|---|---|---|
| telephone type | extension line exclusively used by the person himself | local extension in another business establishment | mobile telephone | representative line of a customer | representative | home telephone |
| telephone number | * | 03-*-** | 090--* | 03-*-* | | **** |
| positional information 1 (address) | ... Kanda, Chiyoda Ward, Tokyo | ... Shiba, Minato Ward, Tokyo | | Nihonbashi, Chuo Ward, Tokyo | | Chiba city, Chiba prefecture |
| positional information 2 (postal code) | 〒101-8532 | 〒..... | — | 〒..... | 〒..... | 〒..... |
| positional information 3 (mobile telephone service area number) | — | — | — | — | | |
| business hours | 8:30-17:00 | 8:30-17:00 | | 8:30-17:00 | | 17:00-8:30 |
| others | | | | | | |

TA

Fig. 4 forward destination list LST

| forwarding rank | forwarding candidates | |
|---|---|---|
| 1 | extesion B | Minato district |
| 2 | outside line B | Chuo Ward |
| 3 | extension A | Chiyoda Ward |
| 4 | outside line C | home telephone |
| 5 | outside line A | mobile telephone |

Fig. 5 personal position information: near Minato Ward (forwarding rank 1: Minato district)   (forwarding rank 2: Chuo Ward)   (forwarding rank 3: Chiyoda Ward)

Fig. 6a personal position information:
near Minato Ward
(forwarding rank 1: Minato district)
current time: within the working hours
(8:30 - 17:00)

Fig. 6b personal position information:
near Minato Ward
(forwarding rank 1: mobile telephone)
current time: out of the working hours (17:00 - 8:30)

POSITIONAL INFORMATION TRACKING AND FORWARDING METHOD FOR CONDUCTING OPTIMAL FORWARD DESTINATION CONTROL IN CONFORMITY TO ACTUAL SITUATIONS OF USER

BACKGROUND OF THE INVENTION

1. Field of the Invention

The present invention relates to a positional information tracking and forwarding method and system for detecting the current position of a user from the position of a terminal carried by the user in order to forward a call via the user to a telephone installed near the user.

2. Description of the Related Art

Conventionally, customer station exchanges such as a private branch exchange (PBX) for managing telephones within an office, a key system, and the like have a function of automatically forwarding a call to a previously reserved telephone number when a called user is absent. For example, a plurality of telephone numbers may be registered as candidate forward destinations such that a call to the user is forwarded to these telephone numbers in the order in which they were registered, or is forwarded to different forward destinations in different time periods. For example, a call is forwarded to a forward destination in the morning different from a forward destination in the afternoon. Since this forwarding scheme is based on fixed forward rules, it is not the best forward destination control method for estimating the situations of the user.

For example, supposing that a certain person places a telephone call to a mobile worker Mr. A at extension number #A, there is no guarantee that Mr. A will, without fail, respond to the call at this extension number #A. When Mr. A does not-respond at extension number #A, the call to Mr. A is forwarded to registered telephone numbers in the order in which they were registered. Since Mr. A's whereabouts are unknown, the call must be repeatedly forwarded any number of times until Mr. A answers the forwarded call. In the worst case, the call must be forwarded to all registered destinations. Even if the call is forwarded to a different transfer destination on a time period basis, there are no guarantees that Mr. A will be present at the forward destination.

On the other hand, a connection can be ensured if the call is forwarded to a mobile telephone carried by the user. However, simple forwarding to mobile telephones would be mean a high telephone charge. For example, when Mr. A does not respond to a call to him at extension number # A, the call may be forwarded to a mobile phone which he may be carrying. But it is often the case that Mr. A is present in the same company but in a different office in which there is an extension which Mr. A can use free of charge. In another situation, such as when Mr. A is ill and stays at home, for example, a low cost subscriber telephone or a toll-free IP telephone can be used at his house (i.e. instead of the higher cost mole phone). Therefore, despite the availability of such fixed telephone, forwarding a call to Mr. A's mobile phone would result in a higher telephone charge.

To address such an inconvenience, JP-2000-102059-A, JP-4-301955-A, JP-5-130227-A, and JP-7-131535-A, for example, disclose a method which depends on the position of a terminal (for example, a mobile telephone) carried by a user to determine his or her current location, and then forwards the call to the user through telephone (fixed telephone) near the user. This forwarding method is called the "positional information tracking and forwarding method."

For example, in JP-2000-102059-A, a forwarding center is provided with a forward destination table which stores a plurality of telephone numbers of forward destinations specified by a user which correspond to positional information on the forward destinations. The forwarding center detects the current position of the user from the position of a mobile telephone carried by the user, acquires the telephone number of a forward destination at which the user is highly likely to be present from the forwarding table, and forwards the telephone call to the user at the acquired telephone number.

However, a telephone call acquired from the forward destination table that corresponds to the forward destination where the user is most likely to be, according to the positional information tracking and forwarding method described above, will not be forwarded to other destination if the user is not present at the specific forward destination.

For example, there may be a case where stored forward destinations are in close proximity to one another, such as "Chiyoda Ward," "Minato Ward," and "Chuo Ward," but the forwarding center can only roughly determinate that the user is currently present "near Minato Ward." In this scenario, the forwarding center acquires a telephone number that corresponds to "Minato Ward" from the forward destination table, as the forward destination at which the user is most likely to be, but the call to the user will only be forwarded to the telephone number that corresponds to "Minato Ward." Specifically, if the user is not present in "Minato Ward," the call will not be forwarded to "Chuo Ward" or to "Chiyoda Ward" which are in close proximity to "Minato Ward" even though the user may be present there.

Furthermore, another disadvantage of the system is that once the forwarding center acquires the forward destination table, the call will be forwarded even if the current time is after business hours (at the forward destination), i.e. if the user is not likely to be present.

SUMMARY OF THE INVENTION

It is an object of the present invention to provide a positional information tracking and forwarding method and system which provides the optimal forward destination control means for estimating the actual situations of the user.

To achieve the above object, in a positional information tracking and forwarding method of the present invention, a plurality of forward destinations for a call to the user are stored that correspond to positional information on the forward destinations, and the current position of a user is detected from the position of a terminal carried by the user. Then, forward destinations at which the user is likely to be present are selected in sequence from the stored forward destinations based on the current position of the user detected from the position of the terminal, and the call to the user is forwarded to the selected forward destination.

According to the present invention, the current position of the user is detected from the position of a terminal (for example, a mobile telephone) carried by the user, the forward destination at which the user is most likely to be is selected from a plurality of stored forward destinations based on the current position of the user, and a call to the user is forwarded to the selected forward destination. If there is no response to the forwarded call from the user, the second forward destination at which the user is second most likely to be present is selected, and the call is forwarded to this selected forward destination. Subsequently, in a similar manner, the call is repeatedly forwarded to forward destinations in a sequence based on where the user is most likely to be. Thus, even if the current position of the user can only be roughly identified, and forward destinations are in close proximity to one another, the optimal forward destination control method can estimate the likely situations of the user, i.e. time and place where he or she is likely to be so that a successful call can be made.

Also, in another positional information tracking and forwarding method, the current position of a user is detected from the position of a terminal carried by the user, and a plurality of forward destination that correspond to positional information on the forward destinations and the times periods associated with these forward destinations, are stored. Then, forward destinations at which the user is likely to be present are selected in sequence from the stored forward destinations based on the current position of the user detected from the position of the terminal and the current time, and the call to the user is forwarded to the selected forward destination, i.e. to the user.

According to the present invention, the current position of the user is detected from a terminal (for example, a mobile telephone) carried by the user, and the forward destination at which the user is most likely to be is selected based on the current position of the user and the current time. For example, when the time period information associated with the forward destination is during business hours, and the forward destinations include a mobile telephone other than fixed telephones, the mobile telephone would be placed at a lower rank if the current time is within the business hours. On the other hand, if the current time is after the business hours, the mobile telephone is placed at a higher rank. If there is no response to the forwarded call from the user, a selection is made to the second forward destination at which the user is second most likely to be, and the call is forwarded to this selected forward destination. Thus, the optimal forward destination control method is able to estimate the likely situations of the user such as, for example, by placing a fixed telephone at a higher priority when the current time is within business hours, placing a mobile telephone at a higher priority when the current time is after business hours, and so forth Also, in another positional information tracking and forwarding method of the present invention, the current position of a user is detected from the position of a t terminal carried by the user and a plurality of forward destinations are stored that correspond to position information on the forward destinations and the time periods associated with the forward destinations. Then, a forward destination at which the user is likely to be present is selected from the stored forward destinations based on the current position of the user detected from the position of the terminal, and it is determined whether or not the call to the user should be forwarded to the selected forward destination based on the time period information associated with the selected forward destination and the current time.

According to the present invention, the current position of the user is detected from a terminal (for example, a mobile telephone) carried by the user, and a forward destination at which the user is likely to be is selected based on the current position of the user. Then, it is determined whether or not a call to the user should be forwarded to the selected forward destination based on the time period information associated with the selected forward destination and the current time. For example, when the time period information associated with the forward destination is business hours, the call to the user is forwarded to the selected forward destination if the current time is within business hours. After business hours, the call to the user is not forwarded to the selected forward destination but to the mobile telephone, or the user is notified that there was a call by appropriate communication means such as e-mail. Thus, an optimal forward destination control method can be implemented for estimating the likely situations of the user.

In the invention described above, when a forward destination at which the user is likely to be present is selected from stored forward destinations, a forward destination list may be created for enumerating forward destinations in an order in which the user is more likely to be present, or a forward destination for a call to the user may be directly selected from the search table which stores a plurality of forward destinations that correspond to positional information on the forward destinations.

The above and other objects, features and advantages of the present invention will become apparent from the following description with reference to the accompanying drawings which illustrate examples of the present invention.

DETAILED DESCRIPTION OF THE PREFERRED EMBODIMENTS

In the following, the present invention will be described in detail with reference to the accompanying drawings.

First Embodiment (Base Station Solution Type)

Figure 1:
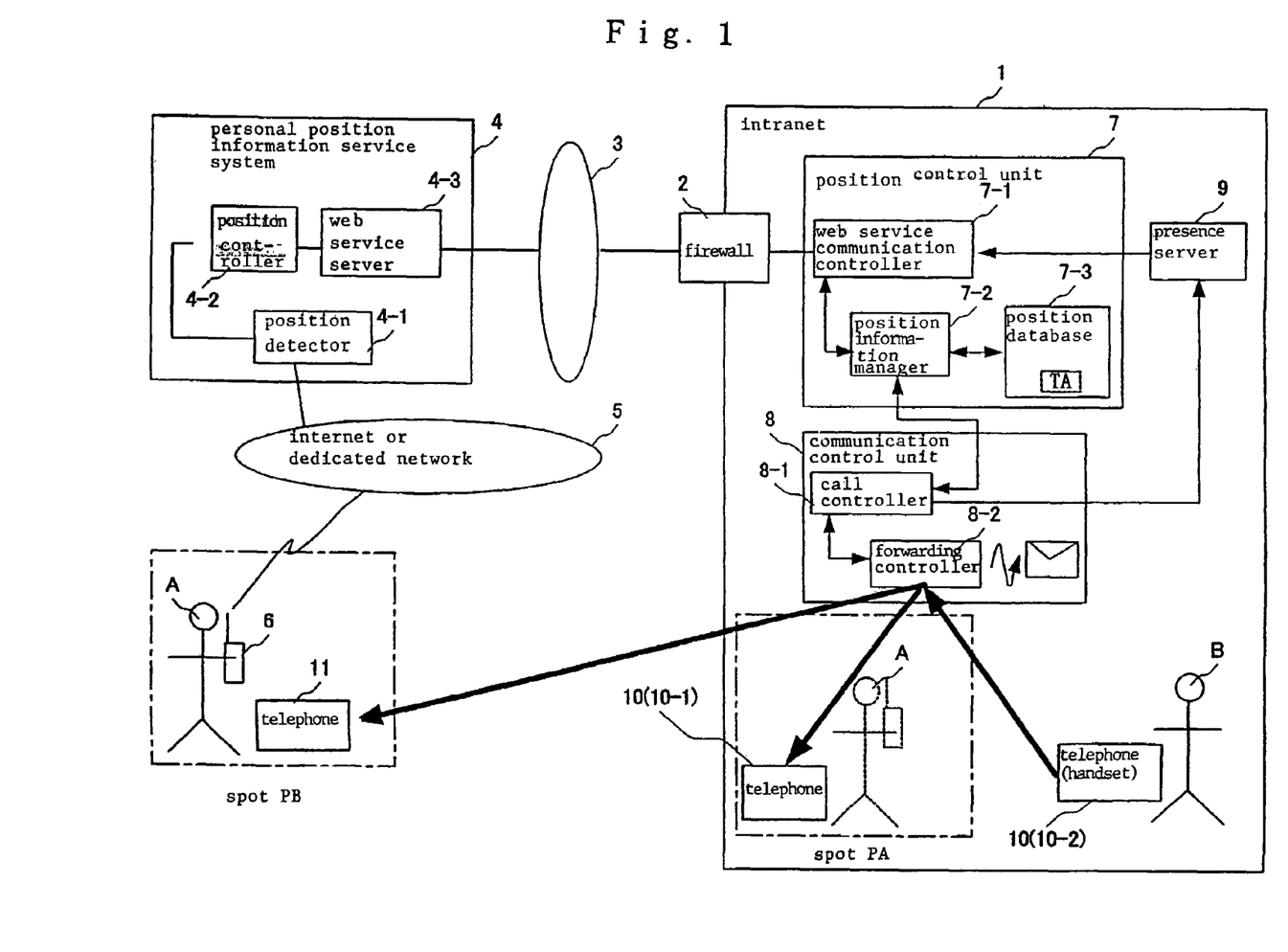
FIG. 1 is a block diagram illustrating the configuration of a first embodiment (base station solution type) of a positional information tracking system for use in implementation of a positional information tracking and forwarding method according to the present invention.

FIG. 1 is a block diagram illustrating the configuration of a first embodiment of a positional information tracking system for use in implementation of a positional information tracking and forwarding method according to the present invention.

In FIG. 1, company 1 for which user A works has an intranet built therein. The intranet of company 1 is connected to network (Internet or dedicated network) 3 through firewall 2. Personal positional information service system 4 is connected to network 3.

Personal positional information service system 4 comprises position detector 4-1, position controller 4-2, and web service server 4-3, and attempts to locate a registered terminal (mobile communication terminal) through network (Internet or dedicated network) 5. GPS (Global Positioning System) may be used for locating the terminal. In this example, mobile telephone 6 carried by user A has been registered in personal positional information service system 4 as a mobile communication terminal.

The intranet of company 1 is connected to position control unit 7, communication control unit 8, presence server 9, and the like. Position control unit 7 comprises web service communication controller 7-1, position information manager 7-2, and position database 7-3, while communication control unit 8 comprises call controller 8-1 and forwarding controller 8-2. Telephones 10 are installed at various places in company 1. FIG. 1 illustrates only extension 10-1 which is exclusively for use by user A, and extension 10-2 which is exclusively for use by user B.

Figure 2:
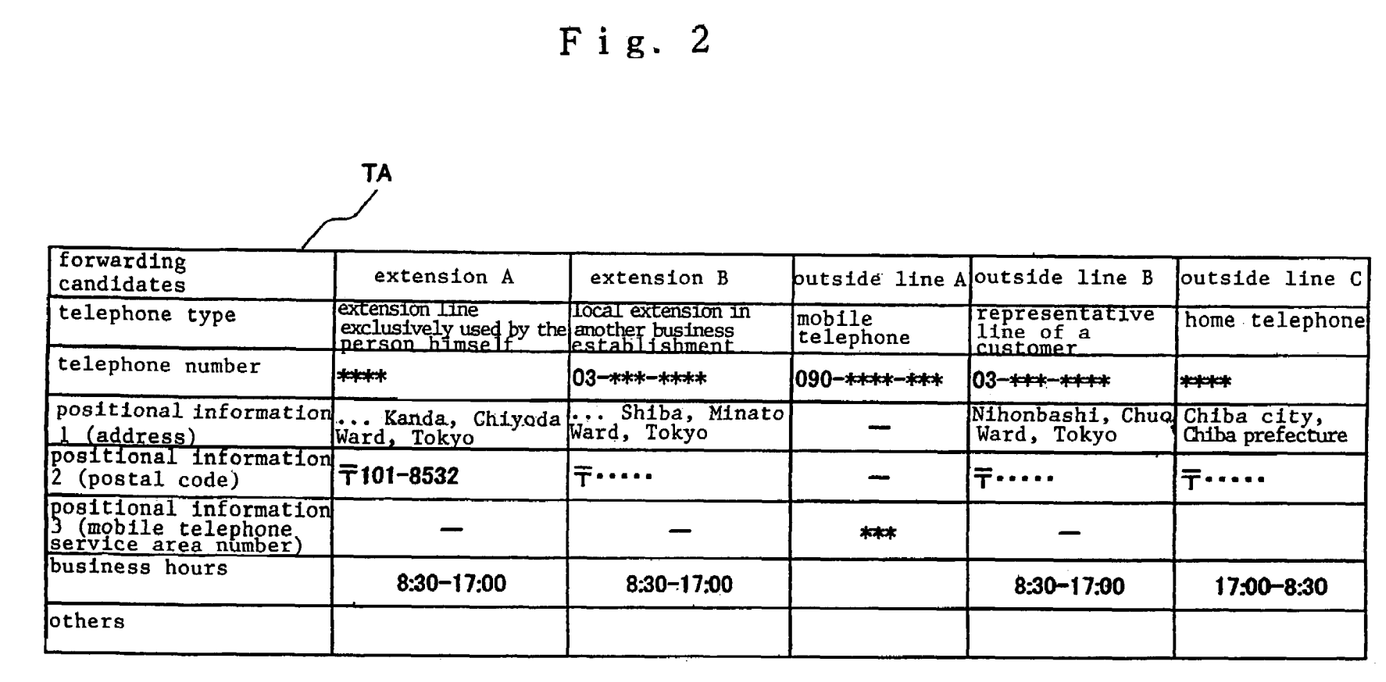
FIG. 2 shows a search table for a user A stored in a position database in the positional information tracking system.

In position control unit 7, position database 7-3 stores a search table for each employee which has been created based on address information and telephone directory information within company 1. FIG. 2 shows exemplary search table TA for user A who is an employee of company 1.

A plurality of forward destinations for a call to user A are written into search table TA for user A that correspond to positional information on the forward destinations. In this example, written into search table TA are telephone numbers of forward destinations (forwarding candidates) which include "extension A (an extension line exclusively used by user A)," "extension B (a local extension in another business establishment)," "outside line A (a mobile telephone of user A)," "outside line B (a representative line of a customer)," and "outside line A (a home telephone of user A)." In addition, "positional information 1 (address)," "positional information 2 (postal code)," and "positional information 3 (mobile telephone service area number)" are also written into search table TA that correspond to each of the forward destinations. Furthermore, business hours that correspond to each of the forward destinations and which serve as time period information, are written into the search table.

In this embodiment, the address associated with "extension A" stored in search table TA is " . . . Chiyoda Ward, Tokyo"; the address associated with "extension B" is " . . . Minato Ward, Tokyo"; and the address associated with "outside line C" is " . . . Chiba city, Chiba prefecture." Also, business hours associated with "extension A" and "extension B" are "8:30–17:00" while business hours associated with "outside line C" is "17:00–8:30."

"Outside line C" is a home telephone, so that after hours (17:00–8:30) of user A are written into search table TA as business hours. Also, in this example, the working hours of user A (8:30–17:00) are the same as the business hours associated with "extension A," "extension B," and "outside line B."

Figure 3:
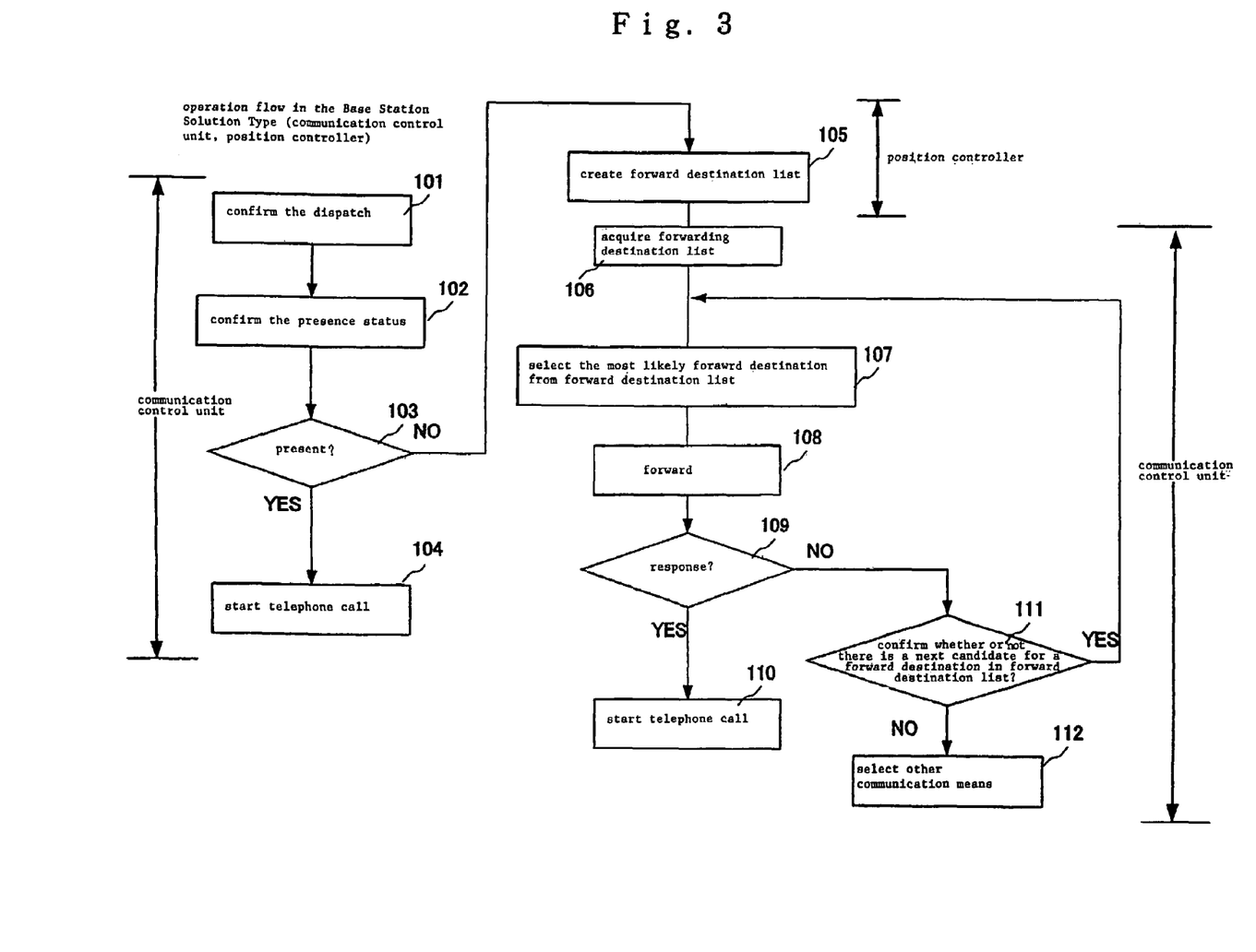
FIG. 3 is a flow chart describing characteristic operations in the positional information tracking system (base station solution type)

Referring next to FIG. 3, description will be made on characteristic operations of the positional information tracking and forwarding system according to the present embodiment. Assume that, in the illustrated example, user A has moved from spot PA in company 1 to spot PB where fixed telephone 11 is installed near user A.

Assume now that user B makes a call from extension 10-2 to extension 10-1 of user A. In this scenario, a dispatch from extension 10-2 to extension 10-1 is made through forward controller 8-2 of communication control unit 8. At step 101, forwarding controller 8-2 confirms the dispatch from extension 10-2 to extension 10-1, and calls extension 10-1.

Then, forwarding controller 8-2 determines at steps 102, 103 whether or not user A is present at his desk depending on whether or not a response is returned from extension 10-1. If a response is returned from extension 10-1 at step 103, forwarding controller 8-2 permits user A and user B to start a telephone call at step 104. If there is no response from extension 10-1 at step 103, forwarding controller 8-2 determines that user A is absent and sends information to presence server 9 through call controller 8-1 indicating that user A is absent. Presence server 9 sends the user A absence information from communication controller 8 to positional information manager 7-2 through web service communication controller 7-1 of position control unit 7.

Upon receipt of the user A absence information from presence server 9, positional information manager 7-2 queries personal positional information service system 4 for the current position of user A through network 3. Personal position information service system 4 detects the position of mobile telephone 6, carried by user A through network 5, and informs the position of mobile telephone 6 to positional information manger 7-2 as the current position of user A.

Figure 4:
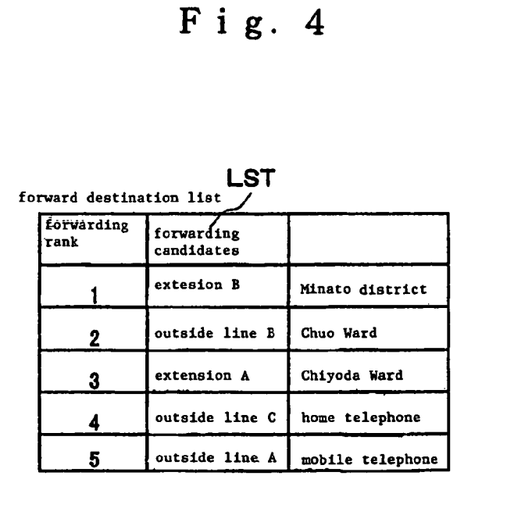
FIG. 4 is a table showing a forward destination list created by a positional information manager in the positional information tracking system.

Positional information manager 7-2 acquires the current position of user A, received from personal positional information service system 4, and creates at step 105 a forward destination list which enumerates forward destinations arranged in an order in which user A is more likely to be present, based on the current position of user A, the current time, and search table TA for user A stored in position database 7-3. For example, when the acquired current position of user A indicates "near Minato Ward," and the current time is within the working hours (8:30–17:00) of user A, positional information manager 7-2 creates forward destination list LST as shown in FIG. 4.

In this event, since the acquired current position of user A is "near Minato Ward," and the current time is within the working hours of user A, "extension B (Minato Ward)" is placed at the first rank, indicating that user A is most likely to answer a call at "extension B (Minato Ward)" if the call is forwarded thereto; "outside line B (Chuo Ward)" is placed at the second rank; and "extension A (Chiyoda Ward)" is placed at the third rank.

In another situation where the acquired current position of user A is in "Chiba prefecture," and the current time is after working hours of user A, "outside line C (home telephone)" is placed at the first rank. Also, even if the acquired current position of user A is "near Minato Ward," when the current time is after working hours of user A, "outside line A (mobile telephone)" is placed at the first rank.

Positional information manager 7-2 sends created forward destination list LST to communication control unit 8. Forward destination list LST from positional information manager 7-2 is provided to forwarding controller 8-2 through call controller 8-1. Forwarding controller 8-2 acquires forwarding destination list LST from positional information manager 7-2 (step 106), and forwards the call to user A in accordance with the sequence (order in which the call is forwarded) defined in the acquired forward destination list LST.

With forwarding list LST shown in FIG. 4, forwarding controller 8-2 selects the telephone number of "extension B (Minato Ward)" at step 107 as the forward destination at which user A is most likely to be present, and forwards the call to user A at the selected telephone number at step 108. In this event, if telephone 11, near user A who is at spot PB, is extension B, user A responds to an incoming call to telephone 11, thereby starting a telephone call with user B at steps 109, 110.

If there is no response to the call at step 109, though the call to user A was forwarded to the telephone number of "extension B (Minato Ward)," forwarding controller 8-2 confirms whether or not there is a next candidate for a forward destination in forward destination list LST at step 111. In this event, since there is a next candidate in forward destination list LST, forwarding controller 8-2 returns to step 107, where forward controller 8-2 selects the telephone number of "outside line B (Chuo Ward) as a forward destination at which user A is next most likely to be present, and forwards the call to user A at the selected telephone number at step 108.

Subsequently, in a similar manner, if there is no response from user A, forwarding controller 8-2 repeatedly forwards the call to "extension A (Chiyoda Ward)," to "outside line C (home telephone)," and to "outside line A (mobile telephone) one after another.

Figure 5:
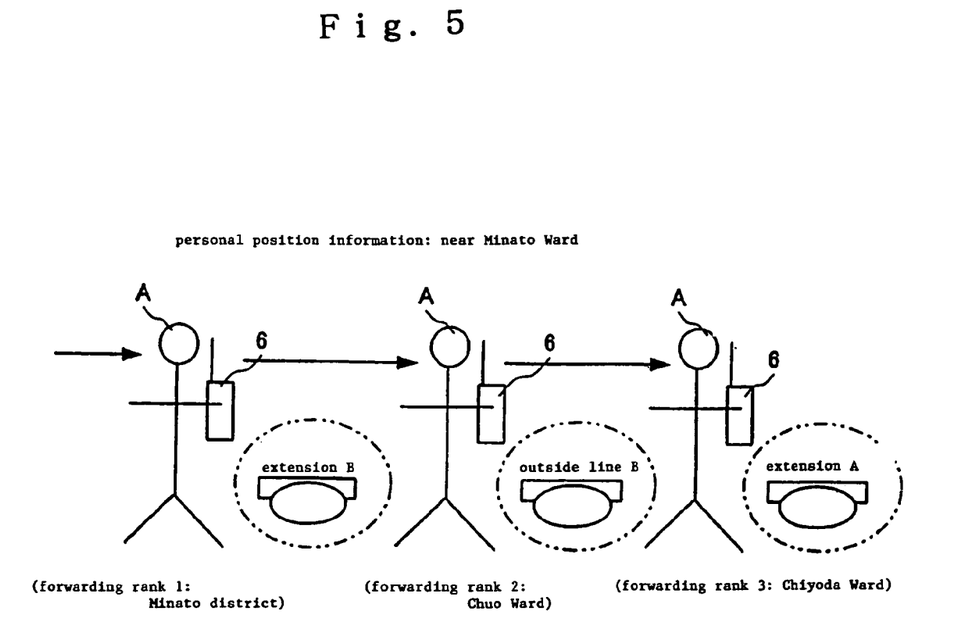
FIG. 5 is a diagram illustrating how a call to a user A is forwarded to "extension B (Minato Ward)" (as the first rank), to "outside line B (Chuo Ward)" (as the second rank), and to "extension A (Chiyoda Ward)" (as the third rank) in accordance with the forward destination list.

In this example, the acquired current position of user A roughly indicates "near Minato Ward" whereas candidates for forward destinations, i.e., "Chiyoda Ward," "Minato Ward," and "Chuo Ward" are in close proximity to each another. In this event, if user A does not respond to a call forwarded to "extension B (Minato Ward)" at the first rank, the call to user A is forwarded to "outside line B (Chuo Ward) at the second rank. If user A does not respond to the call forwarded to "outside line B (Chuo Ward)" at the second rank, the call to user A is again forwarded to "extension A (Chiyoda Ward)" at the third rank (see FIG. 5). As a result, the optimal forward destination control method estimates the likely circumstances of the user A while preventing a failure in forwarding the call to "outside line B (Chuo Ward)" or "extension A (Chiyoda Ward)" though user A is there.

When forwarding controller 8-2 determines at step 111 that candidates for forward destinations have exhausted on forward destination list LST after repeated forwarding, forwarding controller 8-2 notifies user A that there was a call, using other communication means (for example, e-mail) at step 112.

Figure 6A:
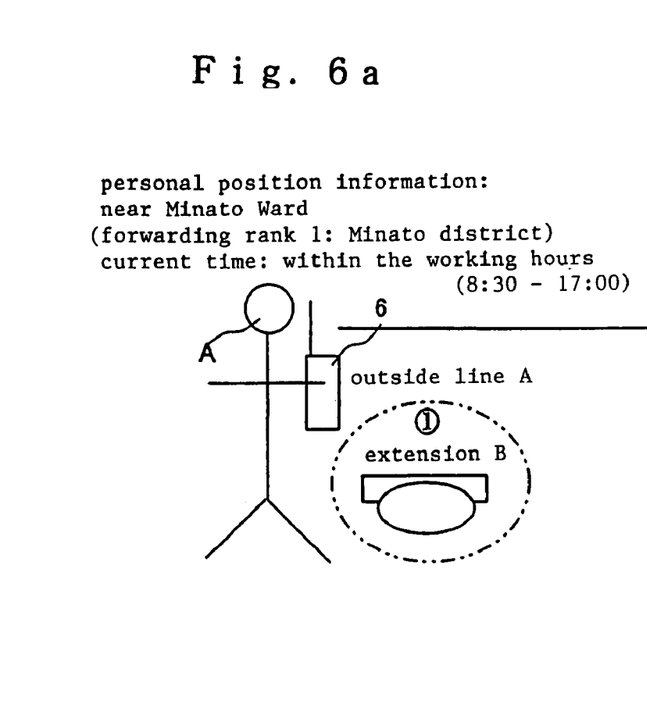
FIGS. 6a and 6b are diagrams each illustrating a situation where a different forward destination is placed at the first rank depending on the current time.
Figure 6B:
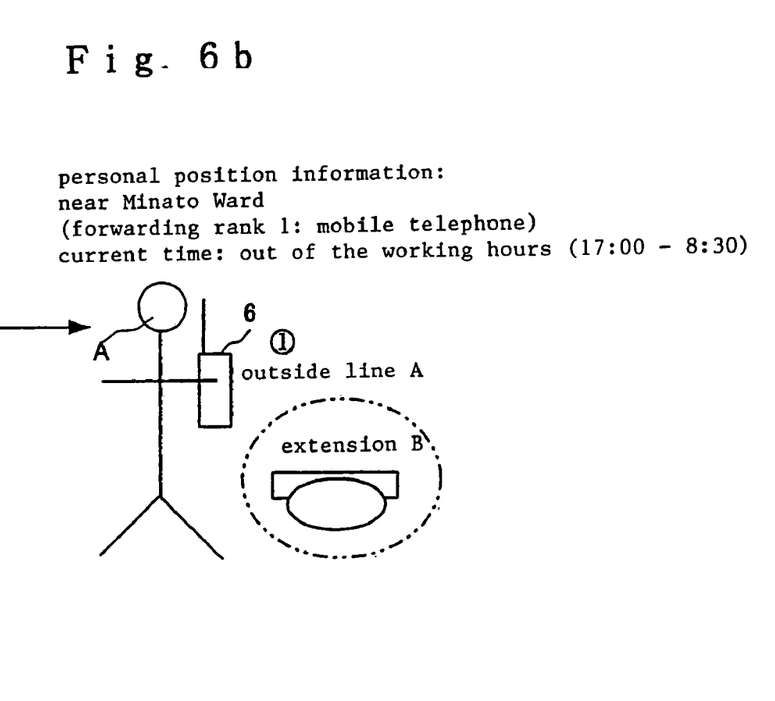

Even if the acquired current position of user A is "near Minato Ward," "outside line A (mobile telephone)" is placed at the first rank on forward destination list LST when the current time is after working hours of user A. Specifically, as illustrated in FIG. 6a, "extension B (Minato Ward)" is placed at the first rank if the current time is within the working hours of user A. On the other hand, if the current time is after working hours of user A, "outside line A (mobile telephone) is placed at the first rank, as illustrated in FIG. 6b.

The foregoing strategy prevents forwarding controller 8-2 from forwarding the call to "extension B (Minato Ward)," "outside line B (Chuo Ward)," or "extension A (Chiyoda Ward) when the current time is after business hours there, i.e., because user A is unlikely to be present there. In addition, the call to user A is immediately forwarded to mobile telephone 6 of user A, thus accomplishing an optimal forward destination control method for estimating the likely situations of user A.

In this embodiment, when user A returns to company 1, extension 10-1, for exclusive use by user A, is designated as the first rank for forwarding a call to user A. In other words, a call to user A is automatically forwarded to a candidate other than extension 10-1 once user A goes out of company 1, whereas a call to user A is automatically forwarded to extension 10-1 when user A has returned to company 1, so that the forwarding function need not be set or cleared for each activity of user A.

Second Embodiment (Handset Solution Type)

Figure 7:
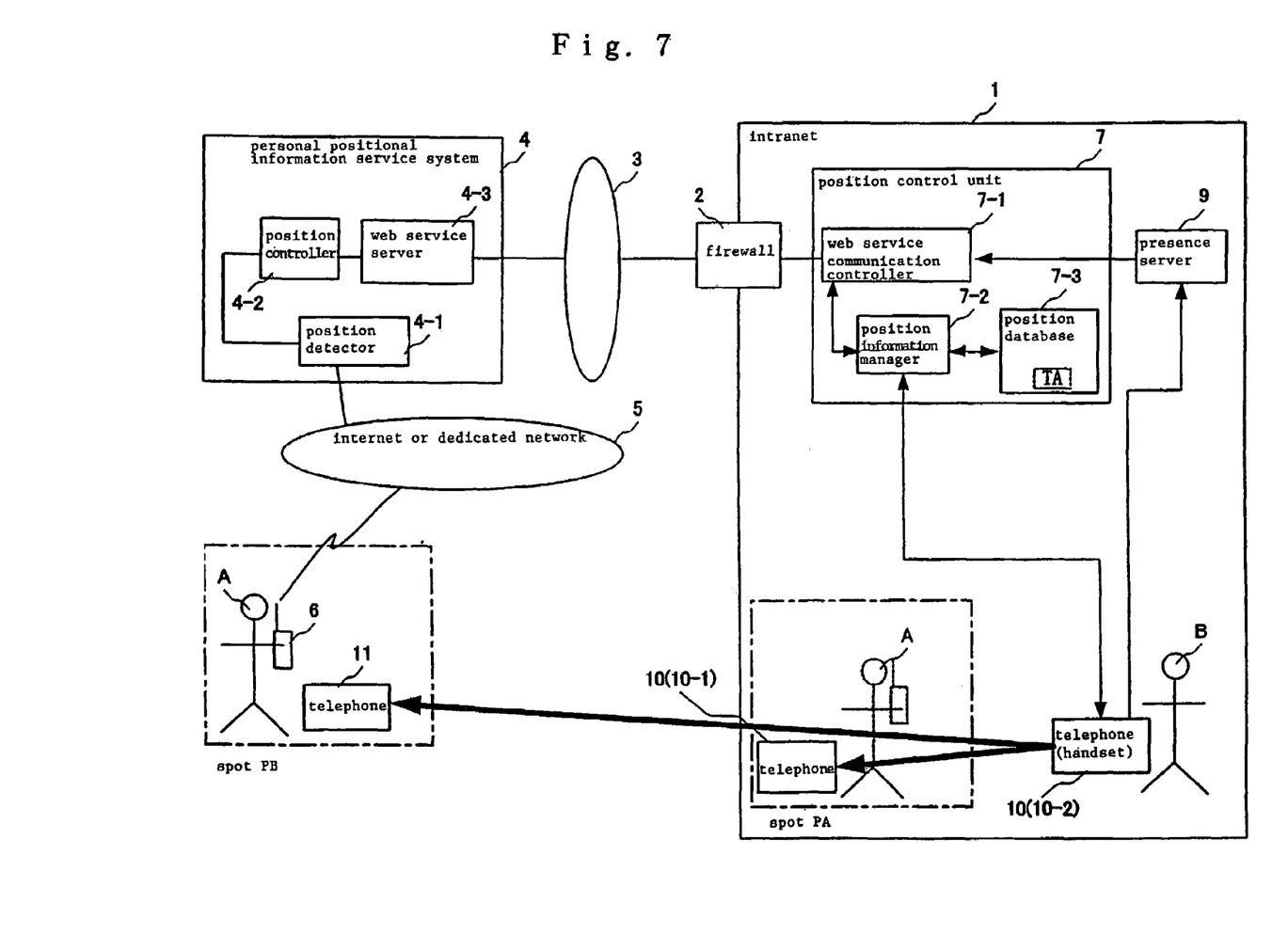
FIG. 7 is a block diagram illustrating the configuration of a second embodiment (handset solution type) of the positional information tracking system for use in implementation of the positional information tracking and forwarding method according to the present invention.

FIG. 7 is a block diagram illustrating a second embodiment of the positional information tracking system for use in implementation of the positional information tracking and forwarding method according to the present invention. In this system, telephone (handset) 10-2 itself acquires forward destination list LST, without the aid of communication control unit 8 illustrated in FIG. 1, and forwards a call to user A in accordance with the order (forwarding rank) on this forward destination list LST.

Figure 8:
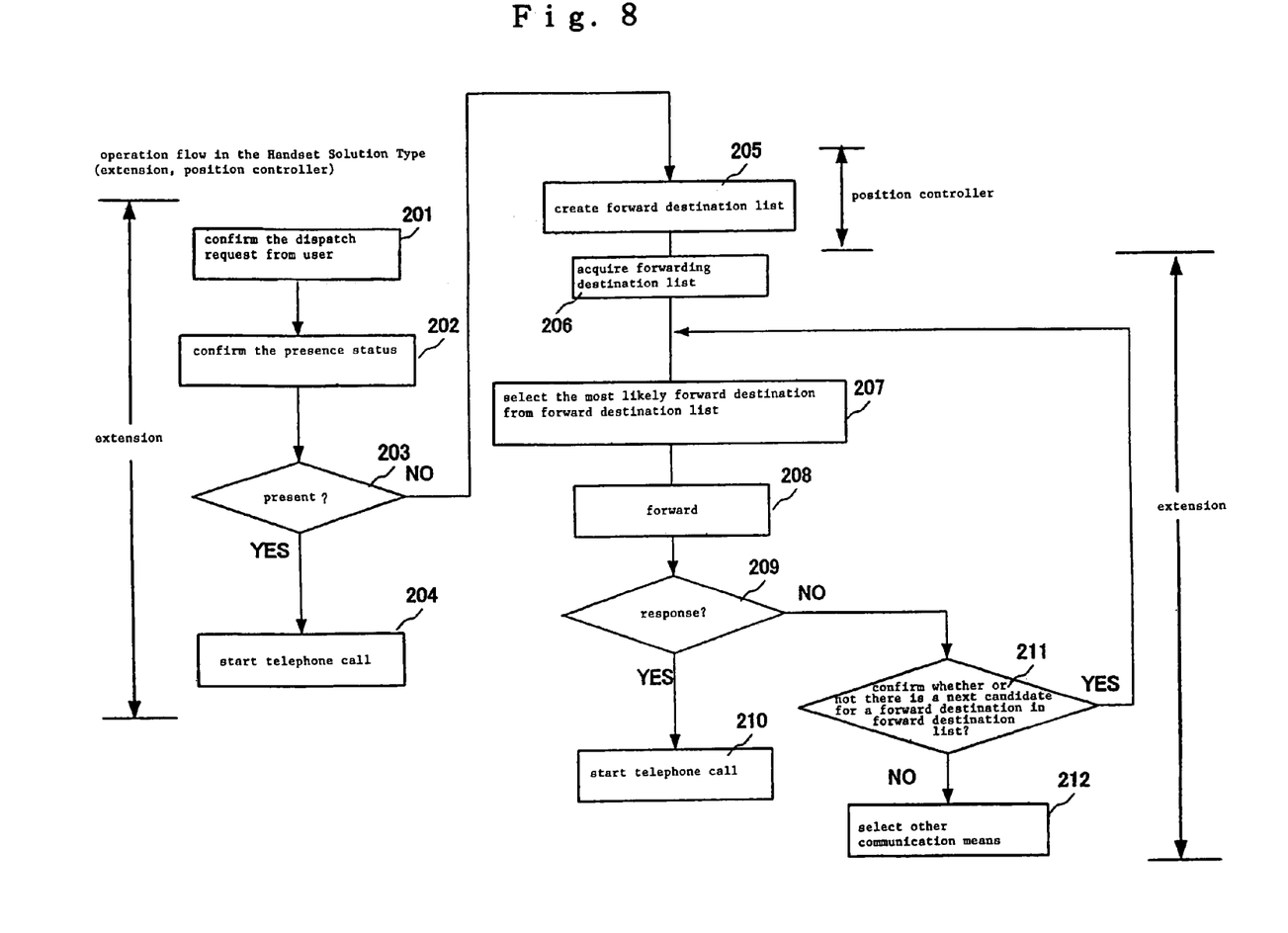
FIG. 8 is a flow chart describing characteristic operations in the positional information tracking system (handset solution type)

Referring next to the flow chart of FIG. 8, a description will be made of the positional information tracking system according to this embodiment.

Assume now that user B makes a call from extension 10-2 to extension 10-1 of user A. In this scenario, extension 10-2 confirms a dispatch request from user B to extension 10-1 of user A at step 201, and calls extension 10-1.

When there is a response from extension 10-1 at step 203, extension 10-2 permits a telephone call to start between user A and user B at step 204. When there is no response from extension 10-1 at step 203, extension 10-2 determines that user A is absent, and sends absence information to presence server 9 for notifying that user A is absent. Presence server 9 sends the user A absence information from extension 10-2 to positional information management unit 7-2 through web service communication controller 7-1 of position control unit 7.

Upon receipt of user A absence information from presence server 9, positional information manager 7-2 queries personal positional information service system 4 for the current position of user A through network 3. Personal position information service system 4 detects the position of mobile telephone 6 carried by user A through network 5, and informs the position of mobile telephone 6 to positional information manger 7-2 as the current position of user A.

Positional information manager 7-2 acquires the current position of user A received from personal positional information service system 4, and creates at step 205 a forward destination list which enumerates forward destinations arranged in the order in which user A is more likely to be, based on the current position of user A, the current time, and search table TA for user A stored in position database 7-3.

Positional information manager 7-2 sends created forward destination list LST to extension 10-2. At step 206, extension 10-2 acquires forward destination list LST from positional information manager 7-2, and forwards a call to user A in accordance with the order (order in which the call is forwarded) defined in the acquired forward destination list LST.

With forwarding list LST shown in FIG. 4, extension 10-2 selects the telephone number of "extension B (Minato Ward" at step 207 as the forward destination at which user A is most likely to be present, and forwards the call to user A at the selected telephone number at step 208. In this event, if telephone 11, near user A who is at spot PB, is extension B, user A responds to an incoming call to telephone 11, thereby starting a telephone call with user B at steps 209, 210.

If there is no response to the call at step 209, extension 10-2 confirms whether or not there is a next candidate for a forward destination in forward destination list LST at step 211, when the call to user A is forwarded to the telephone number of "extension B (Minato Ward),". In this event, since there is a next candidate in forward destination list LST, extension 10-2 returns to step 207, where extension 10-2 selects the telephone number of "outside line B (Chuo Ward) as the forward destination at which user A is next most likely to be present, and forwards the call to user A at the selected telephone number at step 208.

Subsequently, in a similar manner, if there is no response from user A, extension 10-2 repeatedly forwards the call to "extension A (Chiyoda Ward)," to "outside line C (home telephone)," and to "outside line A (mobile telephone) one after another.

When candidates for forward destinations have exhausted on forward destination list LST after repeated forwarding at step 211, forwarding controller 8-2 notifies user A that there was a call to user A, using other communication means (for example, e-mail) at step 212.

Third Embodiment

While forward destination list LST is created from search table TA in the first and second embodiments described above, forward destination list LST need not always be created. For example, a forward destination may be directly selected from search table TA.

Third Embodiment—1: Base Station Solution Type

Figure 9:
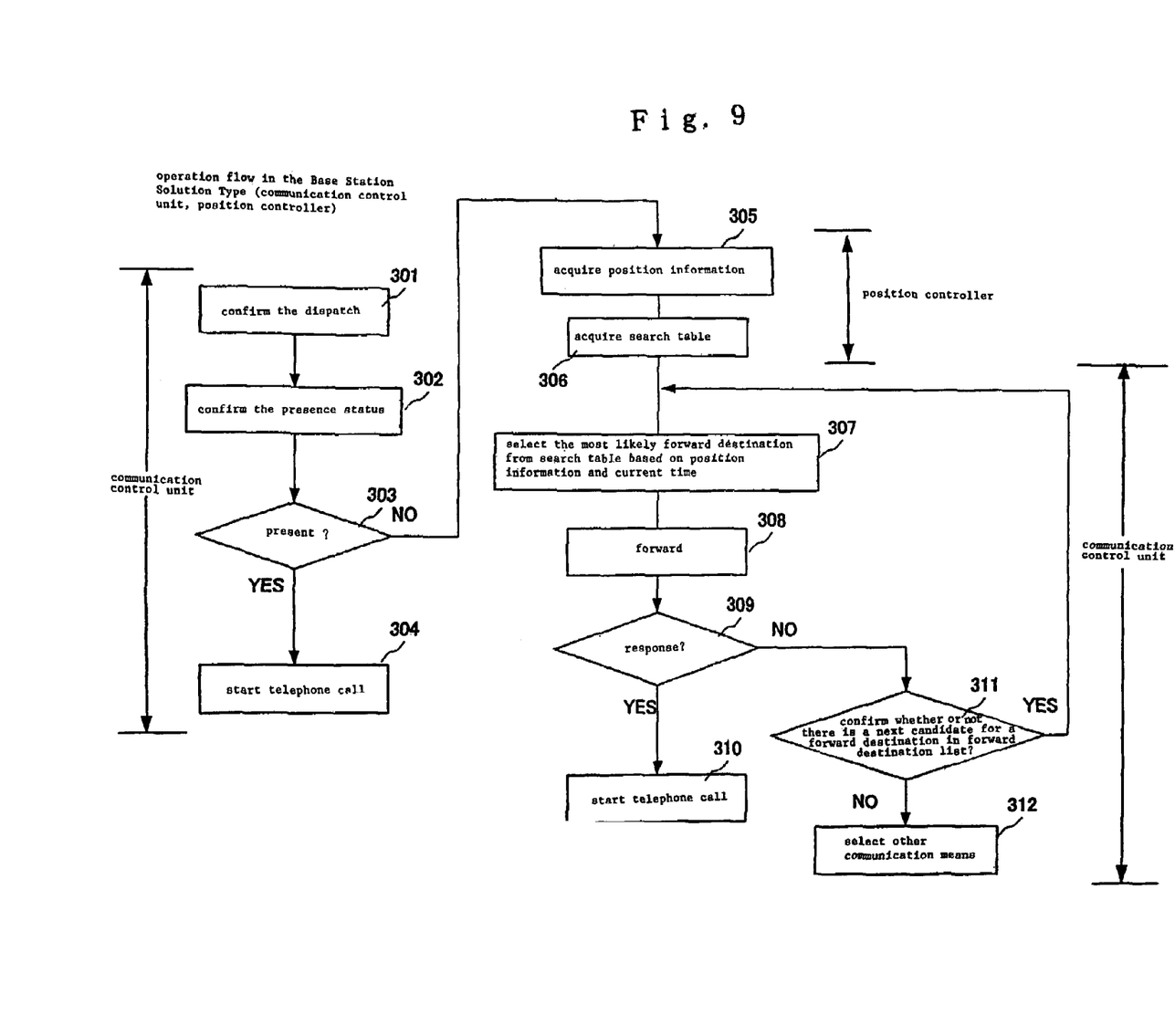
FIG. 9 is a flow chart illustrating the operation of the base station solution type system when a forward destination is directly selected from a search table stored in the position database.

FIG. 9 illustrates the flow of operations in the base station solution type when a forward destination is directly selected from search table TA. In this event, communication control unit 8 (FIG. 1) sends absence information to presence server 9 for indicating that user A is absent through steps 301, 302, 303 corresponding to steps 101, 102, 103 shown in FIG. 3. The user A absence information is sent to positional information manager 7-2.

Upon receipt of the user A absence information, positional information manager 7-2 queries personal positional information service system 4 for the current position of user A through network 3. Personal positional information service system 4 detects the position of mobile telephone 6 carried by user A through network 5, and informs the position of mobile telephone 6 to positional information manager 7-2 as the current position of user A.

Positional information manager 7-2 acquires the current position of user A received from personal positional information service system 4 at step 305, also acquires search table TA for user A from position database 7-3 at step 306, and sends the acquired current position of user A and search table TA for user A to communication control unit 8. The current position of user A and search table TA for user A are provided to forwarding controller 8-2 through call controller 8-1.

Forwarding controller 8-2 selects the most likely forward destination from search table TA for user A, based on the current position of user A and the current time at step 307, and forwards the call to user A at the selected forward destination at step 308. If there is no response to the forwarded call at step 309, forwarding controller 8-2 confirms whether or not there is a next candidate in search table TA at step 311. If there is a next candidate, forwarding controller 8-2 returns to step 307, where forwarding controller 8-2 selects the next most likely forward destination from search table TA for user A based on the current position of user A and the current time, and forwards the call to user A at the selected forward destination at step 308.

Subsequently, in a similar manner, if there is no response to the forwarded call, transfer controller 8-2 directly selects forward destinations from search table TA in the order of higher likelihood, and repeatedly forwards the call to user A.

When candidates for forward destinations have been exhausted in search table TA after repeated forwarding at step 311, forwarding controller 8-2 notifies user A that there was a call to user A, using other communication means (for example, e-mail) at step 312.

Third Embodiment—2: Handset Solution Type

Figure 10:
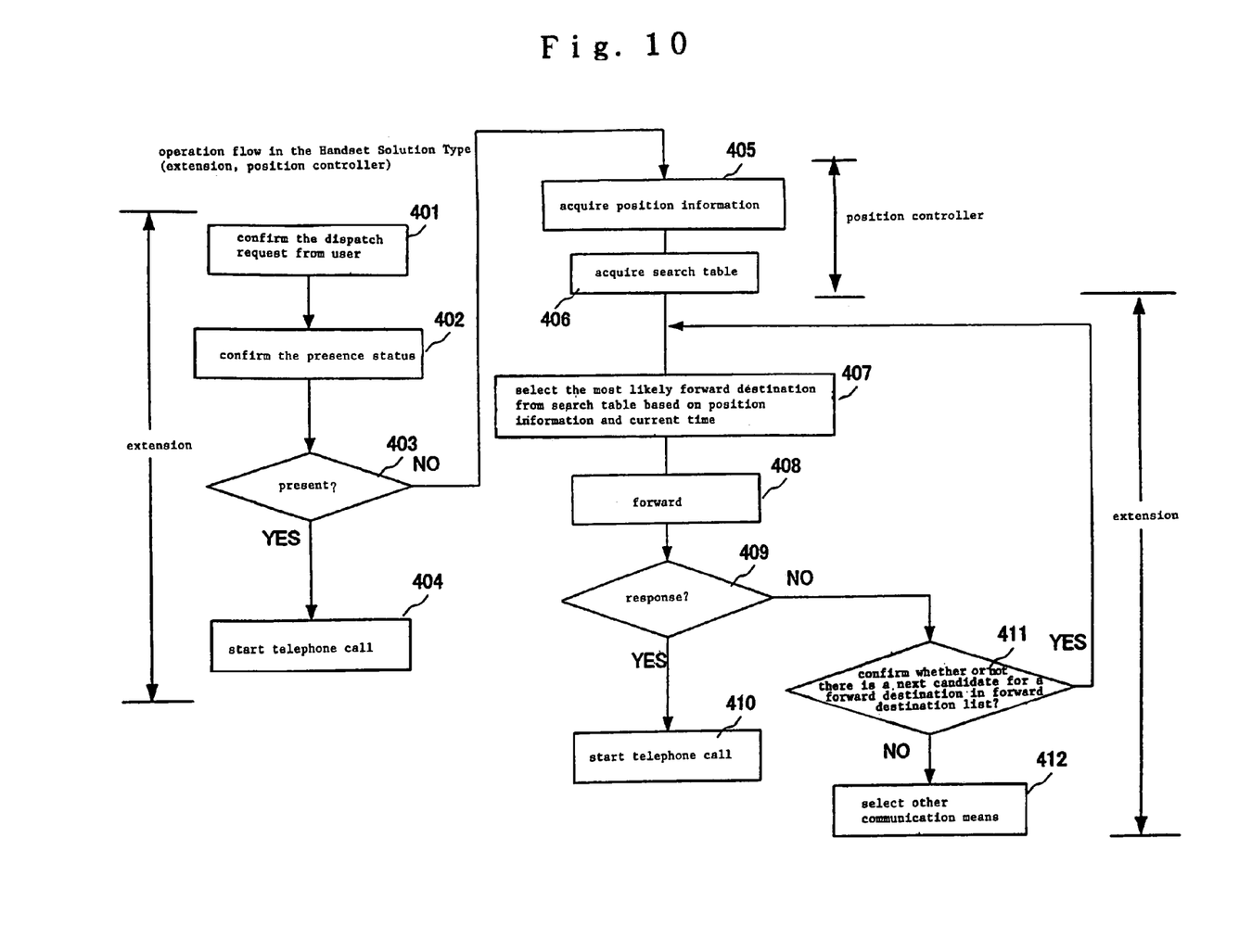
FIG. 10 is a flow chart illustrating the operation of the handset solution type system when a forward destination is directly selected from the position database.

FIG. 10 illustrates the flow of operations in the handset solution type when a forward destination is directly selected from search table TA. In this event, extension 10-2 (FIG. 7) sends absence information to presence server 9 for indicating that user A is absent through steps 401, 402, 403 corresponding to steps 201, 202, 203 respectively shown in FIG. 8. The user A absence information is sent to positional information manager 7-2.

Upon receipt of the user A absence information, positional information manager 7-2 queries personal positional information service system 4 for the current position of user A through network 3. Personal positional information service system 4 detects the position of mobile telephone 6 carried by user A through network 5, and informs the position of mobile telephone 6 to positional information manager 7-2 as the current position of user A.

Positional information manager 7-2 acquires the current position of user A received from personal positional information service system 4 at step 405, also acquires search table TA for user A from position database 7-3 at step 406, and sends the acquired current position of user A and search table TA for user A to extension 10-2.

Extension 10-2 selects the most likely forward destination from search table TA for user A, based on the current position of user A and the current time at step 407, and forwards the call to user A at the selected forward destination at step 408. If there is no response to the forwarded call at step 409, extension 10-2 confirms whether or not there is a next candidate on search table TA at step 411. If there is a next candidate, extension 10-2 returns to step 407, where extension 10-2 selects the next most likely forward destination from search table TA for user A based on the current position of user A and the current time, and forwards the call to user A at the selected forward destination at step 408.

Subsequently, in a similar manner, if there is no response to the forwarded call, extension 10-2 directly selects forward destinations from search table TA in the order of higher likelihood, and repeatedly forwards the call to user A.

When candidates for forward destinations have been exhausted in search table TA after repeated forwarding at step 411, extension 10-2 notifies user A that there was a call for user A, using other communication means (for example, e-mail) at step 412.

Fourth Embodiment

Whereas the business hours are associated with the forward destination in search table TA as time period information in the first, second, and third embodiments described above, the business hours need not always be associated with the forward destination. In other words, the forwarding order may be determined simply from the current position without taking into consideration the current time upon determination of the forwarding order.

Fifth Embodiment

In the first and third embodiments described above, forward destinations at which user A is more likely to be present are selected in order, for forwarding a call to user A. Alternatively, the selection may be made only for the most likely forward single destination. In this event, however, it must be determined whether or not a call to user A should be forwarded to the forward destination based on the business hours associated with the selected forward destination and the current time.

For example, "extension B (Minato Ward)" is selected as the most likely forward destination, the business hours associated with "extension B (Minato Ward)" are compared with the current time, such that the call to user A is forwarded to "extension B (Minato Ward)" when the current time is within the business hours (within the working hours of user A), and the call to user A is forwarded to mobile telephone 6 of user A, rather than to "extension B (Minato Ward)" or user A is notified of the call to him by appropriate communication means such as e-mail when the current time is after business hours (i.e. after working hours of user A).

Whereas the mobile communication terminal carried by user A is chosen to be a mobile telephone in the foregoing first to fifth embodiments, the mobile communication terminal is not limited to the mobile telephone, but an information terminal such as PDA (Personal Digital Assistant) and the like may be used instead.

Also, whereas in the foregoing first to fifth embodiment, the current position of user A is detected by personal positional information service system 4 when positional information management unit 7-2 receives the absence information indicating that user A is absent, position control unit 7 may detect the current position of user A on a periodic basis to create forward destination list LST.

While preferred embodiments of the present invention have been described using specific terms, such description is for illustrative purposes only, and it is to be understood that changes and variations may be made without departing from the spirit or scope of the following claims.

What is claimed is:

1. A positional information tracking and forwarding method comprising the steps of:
   detecting the current position of a user from the position of a terminal carried by the user;
   storing a plurality of forward destinations for a call to the user that correspond to positional information on the forward destinations; and
   selecting forward destinations in sequence one after another at which the user is likely to be present from the stored forward destinations based on the current position of the user detected from the position of the terminal, and forwarding the call to the user at the selected forward destination,
   wherein the step of selecting forward destinations in sequence one after another comprises:
   sending the call to a highest ranking one of the plurality of forward destinations that are stored;
   determining if the call to the highest ranking one of the plurality of forward destinations is answered within a predetermined time period after the call has been sent;
   if the call to the highest ranking one of the plurality of forward destinations has not been answered within the predetermine time period, repeating the sending step with a next-highest ranking one of the plurality of forward destinations that are stored.

2. A positional information tracking and forwarding method comprising the steps of:
   detecting the current position of a user from the position of a terminal carried by the user;
   storing a plurality of forward destinations for a call to the user that correspond to positional information on the forward destinations and time period information associated with the forward destinations; and
   selecting forward destinations in sequence one after another at which the user is likely to be present from the stored forward destinations based on the current position of the user detected from the position of the terminal and the current time, and forwarding the call to the user at the selected forward destination,
   wherein the step of selecting forward destinations in sequence one after another comprises:
   sending the call to a highest ranking one of the plurality of forward destinations that are stored;
   determining if the call to the highest ranking one of the plurality of forward destinations is answered within a predetermined time period after the call has been sent;
   if the call to the highest ranking one of the plurality of forward destinations has not been answered within the predetermine time period, repeating the sending step with a next-highest ranking one of the plurality of forward destinations that are stored.

3. A positional information tracking and forwarding method comprising the steps of:
   detecting the current position of a user from the position of a terminal carried by the user;
   storing a plurality of forward destinations for a call to the user that correspond to positional information on the forward destinations and time period information associated with the forward destinations;
   selecting forward destinations in sequence one after another at which the user is likely to be present from the stored forward destinations based on the current position of the user detected from the position of the terminal;
   determining whether or not the call to the user should be forwarded to the selected forward destination based on the time period information associated with the selected forward destination and the current time.
   wherein the step of selecting forward destinations in sequence one after another comprises:
   sending the call to a highest ranking one of the plurality of forward destinations that are stored;
   determining if the call to the highest ranking one of the plurality of forward destinations is answered within a predetermined time period after the call has been sent;
   if the call to the highest ranking one of the plurality of forward destinations has not been answered within the predetermine time period, repeating the sending step with a next-highest ranking one of the plurality of forward destinations that are stored.

4. A positional information tracking and forwarding system comprising:
   a means for detecting the current position of a user from the position of a terminal carried by the user;
   a means for storing a plurality of forward destinations for a call to the user that correspond to positional information on the forward destinations; and a means for selecting forward destinations in sequence one after another at which the user is likely to be present from the stored forward destinations based on the current position of the user detected from the position of the terminal, and forwarding the call to the user at the selected forward destination, wherein the means for selecting forward destinations in sequence one after another comprises:

means for sending the call to a highest ranking one of the plurality of forward destinations that are stored in the storing means;

means for determining if the call to the highest ranking one of the plurality of forward destinations is answered within a predetermined time period after the call has been sent, wherein, if the call to the highest ranking one of the plurality of forward destinations has not been answered within the predetermine time period, utilizing the sending means and the determining means to forward the call to a next-highest ranking one of the plurality of forward destinations that are stored in the storing means.

5. A positional information tracking and forwarding system comprising:

a means for detecting the current position of a user from the position of a terminal carried by the user;

a means for storing a plurality of forward destinations for a call to the user that correspond to positional information on the forward destinations and time period information associated with the forward destinations; and a means for selecting forward destinations in sequence one after another at which the user is likely to be present from the stored forward destinations based on the current position of the user detected from the position of the terminal and the current time, and forwarding the call to the user at the selected forward destination, wherein the means for selecting forward destinations in sequence one after another comprises:

means for sending the call to a highest ranking one of the plurality of forward destinations that are stored in the storing means;

means for determining if the call to the highest ranking one of the plurality of forward destinations is answered within a predetermined time period after the call has been sent, wherein, if the call to the highest ranking one of the plurality of forward destinations has not been answered within the predetermine time period, utilizing the sending means and the determining means to forward the call to a next-highest ranking one of the plurality of forward destinations that are stored in the storing means.

6. A positional information tracking and forwarding system comprising:

a means for detecting the current position of a user from the position of a terminal carried by the user;

a means for storing a plurality of forward destinations for a call to the user that correspond to positional information on the forward destinations and time period information associated with the forward destinations;

a means for selecting forward destinations in sequence one after another at which the user is likely to be present from the stored forward destinations based on the current position of the user detected from the position of the terminal;

a means for determining whether or not the call to the user should be forwarded to the selected forward destination based on the time period information associated with the selected forward destination and the current time, wherein the means for selecting forward destinations in sequence one after another comprises:

means for sending the call to a highest ranking one of the plurality of forward destinations that are stored in the storing means;

means for determining if the call to the highest ranking one of the plurality of forward destinations is answered within a predetermined time period after the call has been sent, wherein, if the call to the highest ranking one of the plurality of forward destinations has not been answered within the predetermine time period, utilizing the sending means and the determining means to forward the call to a next-highest ranking one of the plurality of forward destinations that are stored in the storing means.

* * * * *